United States Patent [19]

Dinbergs

[11] Patent Number: 4,603,151
[45] Date of Patent: Jul. 29, 1986

[54] SPHERICAL POLYVINYL CHLORIDE PARTICLES

[75] Inventor: Kornelius Dinbergs, Broadview Heights, Ohio

[73] Assignee: The BFGoodrich Company, New York, N.Y.

[21] Appl. No.: 707,729

[22] Filed: Mar. 4, 1985

[51] Int. Cl.⁴ .............................. C08J 9/00; C08F 2/20
[52] U.S. Cl. ...................................... 521/145; 521/56;
521/60; 521/65; 521/921; 526/88; 526/202;
526/344.2; 526/344.3
[58] Field of Search .................... 521/56, 921, 60, 145;
526/88, 202, 344.2, 344.3

[56] References Cited

U.S. PATENT DOCUMENTS

| | | | |
|---|---|---|---|
| 3,620,988 | 11/1971 | Cohen | 524/832 |
| 3,706,722 | 12/1972 | Nelson et al. | 526/225 |
| 4,229,547 | 10/1980 | Cohen et al. | 521/145 |
| 4,360,651 | 11/1982 | Dinbergs | 521/56 |
| 4,458,057 | 7/1984 | Basu | 521/56 |

*Primary Examiner*—Morton Foelak
*Attorney, Agent, or Firm*—Joe A. Powell; Alan A. Csontos

[57] ABSTRACT

Polyvinyl chloride resin in particulate form characterized by said resin particles being spherical in shape and said resin having low amounts of glassy content. Extrudates, such as pipe, formed from the novel resin of this invention have high impact strength. The novel resin of this invention has high bulk density and fast extrusion rates.

17 Claims, 4 Drawing Figures $\dfrac{D_1}{D_2} = 0.5$ $\dfrac{D_3}{D_4} = 0.707$ $\dfrac{D_5}{D_6} = 0.5$

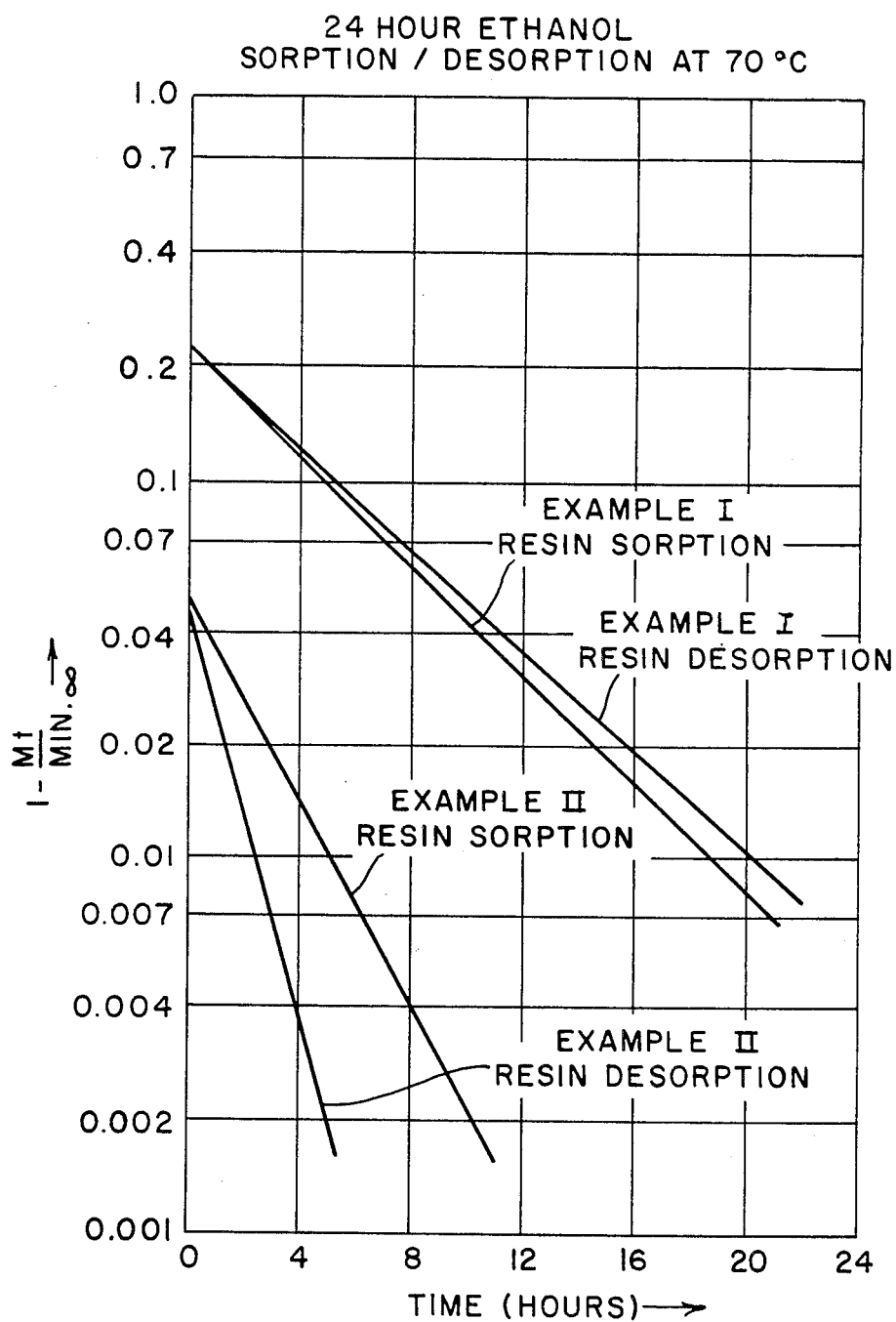

4,603,151

SPHERICAL POLYVINYL CHLORIDE PARTICLES

BACKGROUND OF THE INVENTION

Polyvinyl chloride (PVC) polymers are used in large volumes throughout the world to make various end use products. These polyvinyl chloride resins are normally produced and sold in the form of a free flowing powder made up of individual resin particles. The resin particles are then extruded or calendered into various shapes to form useful products such as pipe and house siding.

An important feature of the resin in extrusion operations is the shape of the resin particle. Assuming a constant particle size and porosity, the more spherical the shape of the resin particle the faster the extrusion rate. Also, a spherical shaped particle will give higher bulk density which results in savings in shipping costs. The higher the bulk density, the more pounds can be loaded into the same volume railcar. Current commercial resins vary in shape from a highly irregular shape resembling "popcorn" to irregular eliptical shapes resembling a distorted "egg".

Producers of polyvinyl chloride have long sought to produce a spherical shape particle. When this desirable goal was attempted in the past, producers found other problems which made the particle undesirable for use in extrudates. One of the problems encountered was what is referred to in the art as particles having "glassy" content or "clears" as they are sometimes referred to in literature. A particle having glassy content sometimes has a transparent appearance and will not readily absorb plasticizer. Sometimes substantial amounts of glassy content can be present as a portion of non-glassy looking particles and, therefore, might not be seen microscopically. This is an important distinction in that some resins might be reported as having low amounts of glassy or clear particles, but in fact, the glassy content of the particles could be much higher. Also residual monomer is difficult to strip from glassy portions of resin. When extruded, resin having large amounts of glassy content will not properly fuse and mix with other particles thus leading to weak spots in the extrudate. The glassy content acts somewhat like contamination by foreign objects. The result of the presence of large amounts of glassy content, of course, is an extrudate with poor impact resistance.

U.S. Pat. Nos. 3,620,998, 3,706,722, 4,229,547, 4,360,651, and 4,458,057 all disclose attempts to produce polyvinyl chloride resin having spherical shaped particles. However, a resin having spherical shaped particles and having low amounts of glassy content was unknown before this invention.

It is a long sought after and desirable goal of the polyvinyl chloride industry to have a resin with spherical shaped particles and low amounts of glassy content.

SUMMARY OF THE INVENTION

A polyvinyl chloride resin in particulate form characterized by at least 25 percent by weight of said resin particles being spherical as evidenced by a Roundometer instrument or by having a shape factor greater than 0.9. The resin particles also have less than about 20 percent by weight of glassy content as measured by an ethanol vapor sorption/desorption method. The resin particles have an average particle size by weight greater than about 70 microns. The novel resin particles of this invention are particularly suitable for making products by extrusion.

BRIEF DESCRIPTION OF DRAWINGS

FIG. 4 is a graph showing the adsorption/desorption of ethanol vapor from spherical polyvinyl chloride resins having different amounts of glassy content.

DETAILED DESCRIPTION

Figure 1:
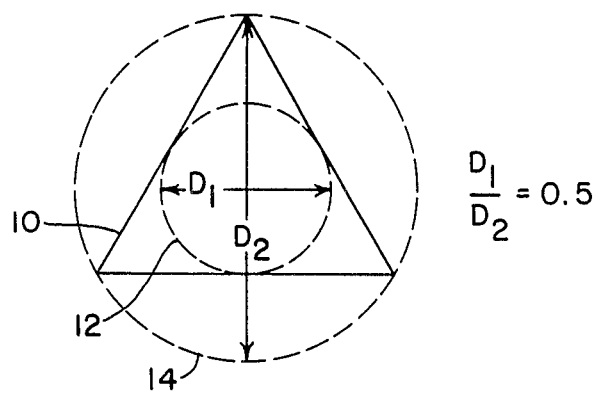
FIG. 1 is an equilateral triangle with an inscribed circle and a circumscribed circle.

Polyvinyl chloride resin as used in this specification means polyvinyl chloride homopolymers as well as vinyl chloride polymerized with up to 50%, preferably up to 20%, by weight of one or more other vinylidene monomers having at least one terminal $CH_2\!=\!C\!<$-grouping. Suitable comonomers that may be polymerized with vinyl chloride are esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art. The amount of comoner that can be polymerized with vinyl chloride is a function of the choice of comonomer, as is well understood by those skilled in the art. Preferably, the polyvinyl chloride polymers of this invention are polyvinyl chloride homopolymers.

One suitable method of preparing the novel resin of this invention is according to a suspension polymerization process such as is disclosed in my U.S. Pat. No. 4,435,524, which is incorporated herein by reference.

The process of U.S. Pat. No. 4,435,524 embodies a suspension polymerization procedure wherein the reaction medium is stirred rapidly during the entire reaction period. With the proper choice of dispersants and surfactants, there is produced spherical, porous particles of polymer having low amounts of glassy content and having high bulk density. In the process, water is the polymerization medium and a vinyl monomer to water ratio in the range of about 1.0 to 10.0 is satisfactory. Preferably a ratio in the range of about 1.0 to 4.0 is employed.

An important feature of the procedure to prepare the resin of this invention is the colloidal stabilization, or dispersant system, that is employed in the polymerization reaction for the purpose of stabiliziang the dispersed monomer droplets against coalescence. An important component of this system is the substantially unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is necessary since an uncrosslinked polyacrylic acid polymer will produce a highly agglomerated charge, which will result in non-spherical resin. The crosslinking is also responsible for making the polyacrylic acid polymer incapable of forming a true solution in water. In this regard, these polyacrylic acid polymers are classified as being substantially insoluble in water. Nevertheless, the structure of the inter polymer must be such that it has enough affinity for water to swell appreciably in an aqueous medium, thus thickening the water phase, but not to the extent that it cannot be agitated rapidly. Interpolymers that have little or no affinity for water and do not swell to any measurable degree, are not suitable for the purposes of the present invention.

While the unneutralized crosslinked interpolymers are preferred, it is possible to employ partially or lightly neutralized interpolymers as dispersants in making the spherical particles of this invention. This partial neutralization can be accomplished by adding to the interpolymer, a sufficient amount of an ordinary monovalent alkali, such as sodium hydroxide, potassium hydroxide, ammonium hydroxide, and the like. The amount of neutralization that can be tolerated and still obtain the desirable and beneficial results will be in the range of about 0.0% to about 5.0% by weight, based upon the weight of the dispersant.

In addition to the crosslinked interpolymers, just described, which act as dispersion stabilizers, there are employed at least two other surfactants in conjunction therewith. For example, polyethylene oxide containing and oil soluble non-polyethylene oxide containing surfactants are used with the crosslinked dispersant. The function of the surfactants is to increase the porosity of the polymer particles and, particularly, to increase the colloidal stability of the polymerization mixture. The use of the crosslinked polymeric dispersant and the surfactants, in conjunction with each other produces a very stable polymerization medium in which the tendency of monomer droplets to coalesce with each other is much less than when using either ingredient by itself. That is to say, a synergism is observed between the carboxyl group-containing crosslinked dispersants and some surfactants.

The amount of the water-insoluble substantially unneutralized crosslinked interpolymer useful as a colloidal stabilizer, or dispersant, in the process of making spherical resins of this invention will vary in the range of about 0.02 parts by weight to about 2.0 parts by weight, based on 100 parts by weight of the monomer or monomers being polymerized. Preferably, the amount used will be in the range of about 0.03 parts by weight to about 0.50 parts by weight per 100 parts by weight of monomer or monomers being polymerized.

The process of making spherical resins of the present invention is preferably conducted at a pH in the range of about 3.0 to about 4.3. Inasmuch as the dispersant is a substantially unneutralized crosslinked interpolymer of one or more carboxylic acid monomers, the polymerization reaction is conducted on the acid side.

With respect to the crosslinked polymeric dispersants used in making spherical resin, the carboxylic acid monomers utilizable in preparing the same are those which contain at least one active carbon-to-carbon double bond in the α,β-position with respect to a carboxyl group such as $$R'-\underset{\underset{R''}{|}}{C}=\underset{\underset{R'''}{|}}{C}-COOH \qquad (1)$$

wherein R' is hydrogen or a —COOH group, and each of R" and R''' is a hydrogen or a monovalent substituent group which is linked to one of the doubly bonded carbon atoms. Carboxylic acids within this definition include acids, such as acrylic acid, wherein the double bond is terminal such as $$CH_2=\underset{\underset{H}{|}}{C}-COOH \qquad (2)$$

of the dicarboxylic acids such as maleic acid and other anhydrides of the general structure

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, α- and β-chloro and bromo-acrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride and others. In many cases it is preferred to copolymerize an anhydride monomer with a comonomer, such as methyl vinyl ether, styrene, and the like.

It is preferred to employ polymeric dispersants which are derived from polymers produced by the polymerization of the α, β-monoolefinically unsaturated carboxylic acids. The preferred carboxylic acids are those derived from the acrylic acids and α-substituted acrylic acids having the general formula $$CH_2=\underset{\underset{R}{|}}{C}-COOH$$

wherein R is a monovalent substituent selected from the group consisting of hydrogen, halogen, hyroxyl, carboxyl, amide, ester, lactone, and lactam.

The most preferred polymeric dispersants are those prepared from the lightly crosslinked interpolymers of acrylic acid. These dispersants are the most efficient.

The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters, -nitriles -acids, -acid anhydrides, -ketones, -alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolymers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene-1,2-diol, 1-phenyl-1,2,3-propanetriol, the polyallyl, -vinyl and -crotyl polyethers containing from two to seven or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glycose, sucrose, and many others, and other polyhydroxy carbohydrate derivatives, the corresponding polyalkenyl silanes, such as the vinyl and allyl silanes; and others. Of this large class of crosslinking agents the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyl chloride, crotyl chloride, and the like, with a strongly alkaline solution of one or more of the poly-hydroxy carbohydrate derivatives.

In the monomeric mixture, for making the crosslinked polymers employed as colloidal stabilizers in the suspension polymerization process used to make the spherical resin of the invention, the two essential monomeric materials should be present in certain proportions, although the exact proportions will vary considerably depending on the characteristics desired in the polymer. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water and solvent-solubility of the resulting crosslinked polymer. When 0.1% to 4.0%, more preferably 0.20% to 2.5%, by weight of the polyether is utilized, water-insoluble polymers are obtained, especially with acrylic acids, which are extremely water sensitive. Useful dispersants are also obtained when 0.1% to 6.0%, and preferably 0.2% to 5% of the polyether is copolymerized with maleic anhydride. In the dual copolymer, or two-compound interpolymer, this means that the remainder of the monomeric mixture will be the carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxyic monomer or monomers should never be less than 25%, and preferably not less than 40%, by weight of the total monomeric mixture. Multi-component interpolymers may be made from monomeric mixtures comprising from 25% to 95% of a carboxylic monomer, such as acrylic acid, 0.1% to 30% of a polyalkenyl polyether, such as a polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are monoolefinic vinylidene monomers containing one terminal $CH_2=C<$ group, such as styrene, the chloro and ethoxy-styrenes, etc., acrylamide, N-methyl-acrylamide, N,N-dimethyl acrylamide, acrylonitrile, methacrylonitrile, methyl acryate, ethyl acrylate, 2-ethylhexylacrylate, methyl methacrylate, vinyl acetate, vinyl benzoate, vinyl pydridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymers of non-carboxylic hydroxyls. Similarly, diesters, such as diallyl maleate, ethylene glycol dimethacrylate, acrylic anhydride, betaallyloxy acrylate, and many others, are readily saponified or hydrolyzed by alkali or acid with the introduction of additional hydroxyl and/or carboxyl groups. Of the additional monomers, N-methyl acrylamide, methyl vinyl ether, ethyl vinyl ether and divinyl ether have been found particularly useful in the production of the substantially unneutralized crosslinked interpolymers for use as substantially water-insoluble dispersants in the suspension polymerization of vinyl monomers.

In the process to prepare the spherical resins of this invention other surfactants are employed, along with the water-insoluble crosslinked polymeric dispersant. Among the surfactants that are satisfactory, include the water-soluble, polyether containing nonionic surfactants. Examples of polyether containing nonionic surfactants useful are those falling within the following generic classes: (1) polyoxyethylene alkylphenols; (2) polyoxyethylene alcohols; (3) polyoxyethylene esters of fatty acids; (4) polyoxyethylene alkylamines; and (5) polyoxyethylene alkylamides. As examples of surfactants in the above-named classes there may be named the following: polyoxyethylene (20) sorbitan monooleate, polyoxyethylene (20) sorbitan monolaurate, polyoxyethyene (20) sorbitan monopalmitate, polyoxyethylene (20) sorbitan monostearate, polyoxyethylene (40) stearate, polyoxyethylene (50) stearate, polyoxyethylene esters of mixed fatty and resin acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. The above compounds have a multiplicity of functional groups and accordingly a very large number of modifications is possible. Mixtures of said compounds can also be used.

Non-polyethylene oxide containing surfactants as taught in U.S. Pat. No. 4,435,524, are used together with a polyethylene oxide containing surfactant and the water-insoluble crosslinked polymeric dispersant. Suitable non-polyethylene oxide containing surfactants are those compounds from the sorbitan ester family or the glycerol ester or polyglycerol ester families, as well as the poly-vinyl alcohols, which do not contain polyethylene oxide segments. As examples of such surfactants there may be named sorbitan trioleate, sorbitan tri-stearate, sorbitan monooleate, sorbitan monopalmitate, glycerol monooleate, glycerol monostearate, triglycerol monooleate, 72.5% hydrolyzed polyvinyl acetate and the like.

The polyethylene-oxide containing surfactant is used at a level of from about 0.005 parts by weight to about 1.0 parts by weight per 100 parts by weight of monomer. Preferably, an amount of about 0.0075 parts by weight to about 0.5 parts by weight per 100 parts by weight of monomer is used. The non-polyethylene oxide containing surfactant is used at a level of from about 0.005 parts by weight to about 0.2 parts by weight per 100 parts by weight of monomer, preferably from about 0.02 parts by weight to about 0.1 parts by weight per 100 parts by weight of monomer.

In the suspension polymerization procedure, the various ingredients are thoroughly mixed prior to the start of the reaction. That is, the aqueous medium, preferably distilled water, the vinyl chloride monomer to be polymerized, the crosslinked polymeric dispersant and the surfactants, and an oil-soluble catalyst are all mixed together at a temperature below that at which the particular catalyst being used becomes active. While this mixing can be done in a vessel apart from the reaction vessel, it may also be done in the polymerization reaction vessel.

The monomer-soluble or oil-soluble catalysts that may be used in the polymerization process to make the spherical particles of the invention are the alkanoyl, aroyl, alkaraoyl, and aralkanoyl diperoxides and monohydroperoxides, azo compounds, peroxy esters, percarbonates, and other free radical type catalysts. As examples of such catalysts, there may be named benzoyl peroxide, lauryl peroxide, diacetyl peroxide, cumene hydroperoxides, methyl ethyl ketone peroxide diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azo-bis isobutyronitrile, $\alpha,\alpha'$-azodiisobutyrate, 2,2'-azobis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The suspension polymerization process to produce spherical resin may be carried out at any temperature which is normal for the monomeric material to be polymerized. Preferably, a temperature in the range of about 25° C. to about 100° C. is employed. In order to facilitate temperature control during the polymerization process, the reaction medium is kept in contact with cooling surfaces cooled by water, brine, evaporation, etc. This is accomplished by employing a jacketed polymerization reactor wherein the cooling materials is circulated through the jacket throughout the polymerization reaction. This cooling is necessary since most all of the polymerization reactions are exothermic in nature. It is understood, of course, that a heating medium can be circulated through the jacket, if necessary.

A most important aspect in making spherical resin is the agitation or stirring of the reaction medium. Prior to the start of the polymerization reaction, the polymerization mixture is agitated to provide shear action to disperse or suspend the monomer(s) in the reaction medium in the form of droplets. These droplets should be of such size that when transformed into polymer particles, which are spherical, and porous, the same will be of the desired size. The polymer particles of the present invention should have an average diameter by weight greater than about 70 microns. Normally, the polymer particles will have an average diameter by weight less than about 1000 microns. Preferably, for most end uses, the polymer particles will have a diameter in the range of about 70 microns to about 500 microns, most preferably from about 100 microns to about 400 microns. Resins with an average particle size by weight less than 70 microns tend to be dusty and build up static easily such that they are less desirable for extrusion operations such as pipe making.

In the suspension process, the monomer droplet is formed and is coated or surrounded by the dispersant and the surfactants. The individual monomer droplets are maintained in the suspension and do not agglomerate. The coating of dispersant and surfactants become a part of the outside surface of the particles in the finished state. Analysis of the surface by ESCA techniques of the resin particles produced in Example II of this specification show that the particle surface comprises the crosslinked dispersant, the polyethylene oxide surfactant and the non-polyethylene oxide surfactant.

As pointed out above, it is important to maintain proper and sufficient agitation throughout the entire polymerization reaction in order to produce the spherical and porous particles of polymer having the proper or desired size. Various means can be employed to get and maintain the proper agitation and shearing action. The reaction vessel or polymerizer is made of stainless steel or glass lined and fitted with a heating and cooling jacket and having a rotatable shaft mounted centrally thereof. On said shaft are mounted one or more agitator blades, which may be flat or curved. Further, one or more baffles are employed which are mounted on the inner wall of the reactor or adjacent thereto. The baffles give an up-and-down, or pumping action to the reaction medium in addition to the circular motion thereof created by the agitator blades.

The particles of this invention are spherical in shape. Spherical shape may be determined by several methods.

One method to determine spherical shape of particles is by use of an instrument known as a Roundometer. A Roundometer separates resin particles into a round and non-round fraction. The Roundometer used in the Examples shown below is a Wald Roundometer Model 63 manufactured by Potters Industries, Inc. in Cleveland, Ohio. When determining spherical shape of PVC resin by use of a Roundometer, it is first desirable to sieve the resin through a 140 mesh screen (105 microns). Polyvinyl chloride resin particles less than 105 microns are difficult to run on a Roundometer instrument because of static electricity interference and inherent problems associated with the Roundometer and small particle sizes as known to those skilled in the art of Roundometer measurements. The separation based on roundness is described in ASTM D 1155-53 standard and is accomplished by varying the amplitude transmitted to the glass plate at a fixed frequency of 60 impulses per second. The amplitude is selected such that the particles do not bounce up and down to interfere with the particles flowing on the plate. For polyvinyl chloride resins this will normally be an amplitude from about 7 to about 14 mils. In the Example below the resin of this invention was run with an amplitude setting of 11 mils. The Roundometer has a 15 inch by 6.5 inch glass plate positioned at an incline of 1.09375 inches which gives an angle of about 5 degrees with respect to the horizontal plane. The plate is vibrated. The Roundometer is then used to separate the particles greater than 105 microns based on their sphericity into spherical and non-spherical fractions. The resin particles are placed onto the vibrating plate at a point about four inches from the raised edge of the incline plate. Non spherical particles will move up the incline plate, while spherical particles will roll down the plate. Some particles will move part of the way up the plate or part of the way down the plate. After sufficient time to determine that these particles will not move further, they are swept to the respective ends of the plate. Weighing of the respective fractions collected at each end determines the percentages of spherical and non spherical particles. The results are reported as a percent (%) spherical by weight.

The results of the Roundometer test can be influenced in a negative way by static charge on the resin. Resin particles with a high static charge may be spherical but still not roll down the plate. However, a non spherical resin with low or no static will not roll down the vibrating plate. In the results reported in the Examples which follow, anti-static materials were not added to the resin tested, however static was dissipated by the use of a Zerostat ® anti-static instrument made by Discwasher, Inc. The Zerostat ® neutralizes static charge on the surface by emitting positive charges when the trigger is squeezed and negative charges upon trigger release. It operates on the principal of Piezoelectricity. The Zerostat ® can be purchased from Aldrich Chemical Company.

High grade commercial polyvinyl chloride pipe resins known before this invention have a percent spherical particles by Roundometer measurements of from less than 1% up to about 11%. The novel resin particles of this invention have percent spherical particles greater than 25%, preferably greater than 50% and more preferably greater than 80% spherical particles. Although the Roundometer test and the shape factor determination was performed on particles greater than 105 microns, the particles from 70 microns to 105 microns are also spherical.

Another very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

Figure 2:
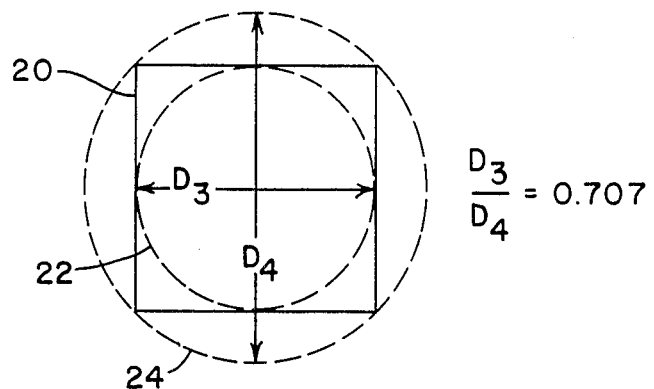
FIG. 2 is a square with an inscribed circle and a circumscribed circle.
Figure 3:
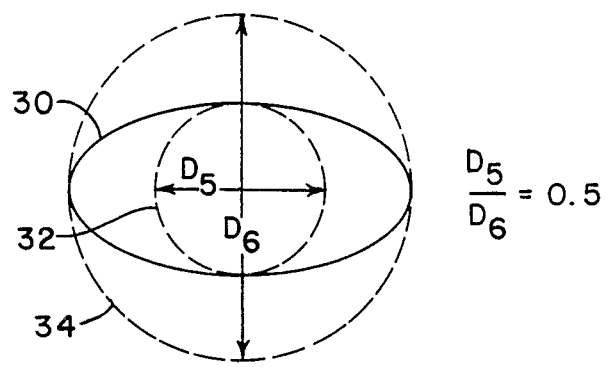
FIG. 3 is an elipse with an inscribed circle and a circumscribed circle.

In FIGS. 1 through 3 of the drawings there is shown some typical shapes and their shape factor. In FIG. 1, there is shown an equilateral triangle 10 with an inscribed circle 12 having a diameter $D_1$ and a circumscribed circle 14 having a diameter $D_2$. The shape factor of this equilateral triangle is equal to $D_1$ divided by $D_2$. Shape factor can be shown mathematically to be 0.5 for an equilateral triangle. In FIG. 2 there is shown a square 20, with an inscribed circle 22 having a diameter $D_3$ and a circumscribed circle 24 having a diameter $D_4$. The shape factor of the square is equal to $D_3$ divided by $D_4$. For a square the shape factor is equal to 0.707. In FIG. 3 there is shown an ellipse 30 having a major axis twice the length of its minor axis. The ellipse has an inscribed circle 32 having a diameter $D_5$ and a circumscribed circle 34 having a diameter $D_6$. The shape factor is equal to $D_5$ divided by $D_6$. For an ellipse with a major axis twice the length of its minor axis, the shape factor would be 0.5.

In the case of a perfect circle, the inscribed and circumscribed circles would have the same diameter and, therefore, the shape factor would be unity (1.0). As can be seen from the above, the more near the shape factor is to 1.0 the more spherical the particle.

Commercial polyvinyl chloride resin particles available before this invention have a shape factor ranging from about 0.7 to about 0.88. The shape factor of the resin particles of this invention is greater than about 0.9, preferably greater than about 0.93, and more preferably greater than about 0.95.

The optical procedure used in the Examples shown below to determine the shape factor was to first screen the particles through a 105 micron screen and run the test on the particles larger than 105 microns, the same as was done for the particles tested by the Roundometer. Static interference can also affect this optical procedure. Particles could be stuck together by static and appear to be agglomerated when in fact they are separate particles. By measuring the particles greater than 105 microns, the static problems are reduced. For smaller particles, static can be reduced by first mixing the resin particles with an organic non-solvent such as ethanol or methanol, evaporating the solvent and then using the optical procedure. In the Examples, 45×optical photomicrographs were prepared that can provide for a count of at least 400 particles for each sample. Using a Zeiss TGZ-3 Particle Analyzer, count the required number of particles by setting the counting aperture at the maximum diameter of the particle. This would form the circumscribed circle. Repeat the count on the same particles but use the minimum diameter of the aperture that will describe the minimum diameter of the particle. This would form the inscribed circle. The shape factor of the resin sample is determined by adding together the diameters of all the inscribed circles and dividing that number by the sum of all the circumscribed diameters. The shape factor for the resin represents an average of the particles in the sample.

Resin having particles with a high shape factor will have a higher bulk density than resin having particles with a lower shape factor assuming constant porosity and particle size. Very simply, spherical objects pack more tightly than do irregular objects. The resins of this invention preferably have a bulk density greater than 0.58 g/cc with the more preferred bulk density being greater than 0.62 g/cc, when used in rigid applications such as pipe and siding. For resins used in flexible applications, the bulk density is preferably greater than 0.50 g/cc. The lower bulk density for flexible applications resin is due to the higher porosity. The increased bulk density of spherical resins over non spherical resin results in increased shipping and storage efficiency, that is more pounds of resin can be stored or shipped in a given railcar volume. Also, with other factors being constant, the increased bulk density and spherical shape result in increased extruder output, meaning more end product such as pipe can be produced on a given piece of extrusion equipment.

In addition to being spherical, another critical feature that the particles of this invention have is that their glassy content is low. Glassy sections are more difficult to fuse and blend into melts and therefore can cause defects in the end product.

The method used to determine the amount of glassy content in the Examples of this specification is a vapor sorption/desorption test using ethanol vapor. The use of vapor sorption kinetics to study and characterize PVC particles is well known in the art. The following references relate to vapor sorption kinetics of PVC particles:

(1) A. R. Berens, *Polymer Preprints*, 15, 203 (1974);
(2) A. R. Berens, *Polymer*, 18, 697 (1977);
(3) A. R. Berens, *Polymer Engineering & Science*, 18, 864 (1978);
(4) C. A. Daniels and G. D. Longeway, *Polymer Engineering & Science*, 19, 181 (1979);
(5) A. R. Berens and G. S. Huvard, *Journal of Dispersion Science and Technology*, 2, 359 (1981).

The following procedure was used to perform the sorption/desorption test with ethanol vapor to determine glassy content of the PVC resins produced in the Examples of this specification:

1. 500 mg sample of PVC resin was weighed on Cahn 2000 Electrobalance in thermostatted vacuum-vapor system controlled at 70° C.; sample was vacuum-dried for 16 hours to constant weight.

2. Ethanol vapor was admitted to a controlled pressure(p) of 54.2 mm Hg (P/Po=0.1, where Po is the saturated vapor pressure at 70° C.), and sample weight was recorded during vapor sorption for 24 hours.

3. Vacuum was then applied, and sample weight was recorded during vapor desorption for 24 hours.

4. For both sorption and desorption, sample weights at various times were used to calculate the quantity $Mt/Min\infty$, where $Mt$ is the weight of ethanol vapor sorbed, or desorbed, at time t, and $Min\infty$ is the ultimate weight sorbed, or desorbed, in 24 hours.

5. Semi-logarithmic plots were made of log $(1-Mt/Min\infty)$ vs. t, from both sorption and desorption data.

6. Straight lines were drawn through the data points defining the limiting slopes of these plots at long time.

7. The extrapolated intercept of these lines with the zero-time axis may be taken as an approximate measure of the fraction of non-porous or "glassy" content in the resin.

8. The extrapolated intercept of the sorption and desorption lines at zero-time axis is averaged to determine the glassy content of the resin.

In FIG. 4, there is shown a graph of the sorption and desorption curves for the resins produced in Example I and Example II below.

The spherical resin particles of this invention have a low amount of glass as determined by the above ethanol sorption/desorption method. The amount of glassy content is less than about 20 percent by weight, preferably less than about 10 percent, and more preferably less than about 5 percent by weight.

The amount of glassy particles may also be counted by preparing 45×optical photomicrographs of at least 1000 particles for each sample. The particles in the sample with glassy appearance may be visually counted. This method will usually give a somewhat lower number than the ethanol sorption/desorption method, because all glass content cannot be detected visually. When counted visually, the spherical resins of this invention were found to have less than 10 percent glassy particles and preferably less than 1 percent.

The spherical resin particles of this invention also have porosity of from about 0.05 cc/g to about 0.5 cc/g as measured using mercury porosimeter. Preferably the porosity is from about 0.1 cc/g to about 0.25 cc/g for rigid applications. For flexible applications, the porosity is preferably from about 0.25 cc/g to about 0.40 cc/g.

To further illustrate the present invention, the following specific examples are given, it being understood that this is merely intended in an illustrative and not a limitative sense. In the examples all parts and percents are by weight unless otherwise indicated.

EXAMPLE I

In this example, a run was made to illustrate a spherical PVC resin that has a high amount of glassy content. This run was made using a polymerization recipe according to the teachings of my U.S. Pat. No. 4,360,651. The polymerization recipe employed was as follows:

| Ingredient | Parts by Weight |
| --- | --- |
| Vinyl Chloride | 100 |
| Water (demineralized) | 150 |
| Polyacrylic acid (unneutralized)[1] | 0.075 |
| Polyethylene oxide containing Surfactant[2] | 0.01 |
| Di-secondary butyl peroxydicarbonate | 0.030 |
| Isopropyl Alcohol | 0.139 |

| Ingredient | Parts by Weight |
| --- | --- |
| Bisphenol A | 0.040 |

(1) Polyacrylic acid crosslinked with 0.2–0.3 part/100 parts monomer of allyl pentaerythritol.
(2) Polyoxyethylene (20) sorbitan monooleate.

In this run, a 4200 liter stainless steel reactor, equipped with agitation means at 40 RPM, was employed. The vinyl chloride monomer along with the polyethylene oxide containing surfactant and di-secondary butyl peroxydicarbonate in an isopropyl alcohol solution were charged to the reactor and agitated. The agitation was stopped and the water and polyacrylic acid were added. The agitation was restarted and reaction temperature was increased to 57° C. The reaction was run until a pressure drop of 70 kpas occurred, then shortstopped with Bisphenol A. Pressure drop starts when the polymerization has progressed to the conversion at which the free monomer (not dissolved in the PVC) no longer exists. Further polymerization results in a reduction of the amount of monomer dissolved in the PVC. The resin produced was then stripped of residual monomer and dried to free flowing resin particles and screened through 40 mesh (420 micron) screen.

EXAMPLE II

In this example a run was made to illustrate one method of preparing the spherical resin particles having low amounts of glassy content according to this invention. The polymerization recipe employed was as follows:

| Ingredient | Parts by Weight |
| --- | --- |
| Vinyl Chloride | 100 |
| Water (demineralized) | 150 |
| Polyacrylic acid (unneutralized)(1) | 0.075 |
| Polyethylene oxide containing Surfactant(2) | 0.01 |
| Non-polyethylene oxide containing Surfactant(3) | 0.075 |
| Di-secondary butyl peroxydicarbonate | 0.030 |
| Isopropyl Alcohol | 0.139 |
| Bisphenol A | 0.040 |

(1) Polyacrylic acid crosslinked with 0.2–0.3 part/100 parts monomer of allyl pentaerythritol.
(2) Polyoxyethylene (20) sorbitan monooleate.
(3) Sorbitan monooleate.

The run was made following the same procedure as in Example I. The non-polyethylene oxide containing surfactant was added in the isopropyl alcohol solution along with the di-secondary butyl peroxydicarbonate. The reaction was continued until a pressure drop of 70 kpas occurred, the same as Example I, and then shortstopped with Bisphenol A. The resin produced was then stripped of residual monomer and dried to free flowing resin particles and screened through a 40 mesh (420 micron) screen as in Example I.

The polyvinyl chloride resin produced from Example I, Example II and two conventional pipe grade PVC resins were measured for sphericity of resin particles. Two methods were used for sphericity, shape factor and weight percent of round particles by the Roundometer. The procedures for these two methods were discussed above in this specification. Other properties measured include mercury porosity which was measured according to ASTM D-2873 procedure; bulk density and funnel flow time in seconds were measured according to ASTM D-1895 procedure and the percent glassy content by ethanol sorption/desorption method which method was also discussed earlier in this specification. The following results were obtained:

TABLE I

| PVC Resin | Percent Round by Roundometer | Shape Factor | Porosity cc/g | g/cc Bulk Density | Funnel Flow (sec) | Percent Glassy Particles by ethanol sorption/desorption |
| --- | --- | --- | --- | --- | --- | --- |
| Conventional Suspension Resin(4) | 0.3 | 0.76 | 0.232 | 0.540 | 20 | — |
| Conventional Mass Resin(5) | 9 | 0.88 | 0.200 | 0.580 | 19 | — |
| Example I Resin | 86 | 0.96 | 0.117 | 0.663 | 13 | 22.0 |
| Example II Resin | 84 | 0.96 | 0.188 | 0.644 | 11 | 4.9 |

(4) and (5) Both of these resins represent typical high grade commercial pipe resin produced by The B. F. Goodrich Company. Resin (4) was produced by the suspension process whereas resin (5) was produced by the mass polymerization process.

As can be seen from Table I, both the resin of Example I and the resin of Example II are much more spherical in shape than conventional resins. The percent of the particles that are round from the Roundometer data is dramatically different from conventional resin (over 80% round vs. less than 10% round). Funnel flow time is also less for the two spherical resin samples. Bulk density is also high for the spherical resin. Improved flow rate and higher bulk density are both advantages of the spherical resin vs. the non spherical conventional resins.

To be excellent as a pipe resin the particles not only should be spherical in shape but also the amount of glassy content should be low. A comparison of the data in Table I shows a dramatic reduction in the amount of glassy content from the resin of this invention (Example II) versus the other spherical resin of Example I. The resin of Example I had 22 percent glassy content while the spherical resin of this invention had only 4.9 percent glassy content.

FIG. 4 is a graph of the ethanol sorption/desorption versus time for the resin produced in Example I and the spherical, low glassy content resin of Example II. From the graph of FIG. 4 it can be seen that the two resins have a dramatic difference in glassy content.

EXAMPLE III

This example is presented to demonstrate the need and significance of low glassy content in a polyvinyl chloride resin. The resin samples of Example I and II were extruded into nominal 1 inch schedule 40 pipe and tested for impact resistance according to the test procedure of ASTM D 2444-80. Pipe was extruded at 380° F. to show that the resin of Example I does not fuse properly at 380° F. whereas the resin of this invention will easily mix and fuse at 380° F. Table 2 shows the results.

TABLE 2

| | Pipe Ft-lbs. Impact | |
|---|---|---|
| Example I Resin | Example II Resin | Suspension Resin Conventional |
| 25 | 144 | 136 |

As can be seen from the data in Table 2, the high glassy content resin of Example I has not fused properly at 380° F. and therefore left weak spots in the pipe resulting in poor impact resistance. The spherical resin of this invention (Example II resin) easily fuse at this temperature and gives high impact resistance. Thus, the resin of this invention makes excellent pipe, whereas the high glassy content resin makes unacceptable pipe.

The invention described above discloses a new and useful polyvinyl chloride resin which has a combination of desirable properties, that is spherical shape, low amounts of glassy content, fast funnel flow, high bulk density, and good porosity.

The spherical particles of polyvinyl chloride resin of this invention may be used in the same manner as currently available non spherical resins. Before extruding into pipe, siding or other useful articles, it is customary to mix small amounts of stabilizers, lubricants, colorants and processing aids with the resin. The mixing and selection of these ingredients are well known to those skilled in the art. The resin is extruded at a temperature sufficient to mix and fuse the resin particles into a homogenous mass.

While the present invention has been described in terms of its specific embodiment, certain modifications and equivalents will be apparent to those skilled in the art and are intended to be included within the scope of the present invention, which is to be limited only by the scope of the appended claims.

I claim:

1. A polyvinyl chloride resin in particulate form characterized by:
   (a) said resin particles having an average particle size by weight greater than about 70 microns;
   (b) at least about 25 percent by weight of said particles are spherical in shape as evidenced by a Roundometer instrument;
   (c) said resin having less than about 20 percent by weight of glassy content as measured by ethanol sorption/desorption method
   (d) said resin has a mercury porosity of from about 0.05 cc/g to about 0.5 cc/g.

2. A resin of claim 1 wherein at least 50 percent by weight of said particles are spherical in shape as evidenced by a Roundometer instrument.

3. A resin of claim 2 wherein at least 80 percent by weight of said particles are spherical in shape as evidenced by a Roundometer instrument.

4. A resin of claim 1 wherein said resin has less than about 10 percent by weight of glassy content as measured by ethanol sorption/desorption method.

5. A resin of claim 1 wherein said resin has less than about 5 percent by weight of glassy content as measured by ethanol sorption/desorption method.

6. A resin of claim 1 wherein said resin has a mercury porosity of from about 0.1 to about 0.25 cc/g.

7. A resin of claim 1 wherein said resin has a bulk density greater than about 0.58 g/cc.

8. A resin of claim 6 wherein said resin has a bulk density greater than 0.62 g/cc.

9. A resin of claim 1 wherein the average particle size by weight is from about 70 microns to about 1000 microns.

10. A resin of claim 10 wherein the average particle size by weight is from about 100 to about 400 microns.

11. A spherical polyvinyl chloride resin in particulate form characterized by said resin particles having an average shape factor greater than about 0.9 and said resin has less than about 20 percent by weight of glassy content as measured by ethanol sorption/desorption method and wherein said resin has an average particle size by weight greater than about 70 microns and wherein said resin has a mercury porosity of from about 0.05 cc/g to about 0.5 cc/g.

12. A resin of claim 11 wherein the average shape factor of said particle is greater than about 0.93.

13. A resin of claim 12 wherein the average shape factor of said particles is greater than about 0.95.

14. A resin of claim 13 wherein said resin has less than about 10 percent by weight of glassy content as measured by ethanol sorption/desorption method.

15. A resin of claim 14 wherein said resin has a bulk density greater than about 0.58 g/cc.

16. A resin of claim 15 wherein said resin has a bulk density greater than about 0.62 g/cc.

17. A polyvinyl chloride homopolymer resin in particulate form characterized by said resin particles having:
   (a) spherical shape as evidenced by said particles greater than 105 microns in diameter having an average shape factor greater than about 0.95; or
   (b) at least 80 percent by weight of said particles greater than 105 microns in diameter are spherical in shape as evidenced by a Roundometer instrument;
   (c) the glassy content of said resin is less than about 5 percent by weight as measured by ethanol sorption/desorption method;
   (d) a bulk density greater than about 0.62 g/cc;
   (e) a mercury porosity from about 0.1 cc/g to about 0.25 cc/g; and
   (f) an average particle size by weight of from about 100 microns to about 400 microns.

* * * * *